United States Patent Office 3,564,368
Patented Feb. 16, 1971

3,564,368
SPINDLE SPEED CONTROL MONITOR
Leroy U. C. Kelling, Waynesboro, Va., assignor to General Electric Company, a corporation of New York
Filed Jan. 10, 1968, Ser. No. 696,795
Int. Cl. H02p 5/06
U.S. Cl. 318—314                                11 Claims

ABSTRACT OF THE DISCLOSURE

The feedback waveform in a closed loop position controlling system for controlling the speed of a spindle is used to generate an envelope waveform which sets the limits of the system response. In the closed loop position controlling system, the speed of the spindle motor is controlled by a train of velocity pulses. The velocity pulses are accumulated by a command phase counter whose output phase is compared with the phase of a feedback waveform whose phase is related to the spindle motor rotational position. The phase difference drives the motor in a direction to reduce the phase difference to zero. At the start of each spindle speed monitoring cycle, a fast and slow phase counter are cleared, preset and started counting by one of the feedback pulses. The presetting operation causes the initial phase preset of these counters to straddle the phase of the feedback pulse. The fast counter provides an output waveform which has its phase advancing slightly faster than the phase of the output signal of the command phase counter. The slow counter provides an output waveform which has its phase advancing slightly slower than the phase of the output signal of the command phase counter. The termination of each feedback pulse is compared in phase with the outputs from the fast and slow counters, and an indication is provided if the feedback waveform falls outside of the limits set by the fast and slow counter waveforms.

BACKGROUND OF THE INVENTION

The present invention pertains to the field of control systems and specifically pertains to the field of speed monitors for closed loop position control systems.

In the prior art it is known to use a closed loop position control system for controlling the movement of a machine tool element or a bed on which a workpiece rests. Some of the prior art U.S. patents which show a closed loop position control system along with various details and modifications are:

(1) Automatic Control Apparatus, 3,211,896, by Evans et al. and assigned to the assignee of the present invention.

(2) Numerical Control System to Keep Object Positioned Within Determined Range, 3,325,633, by Lukens, assigned to the assignee of the present invention.

(3) Error Compensation for Control System, 3,308,279, by Kelling, assigned to the assignee of the present invention.

The basic prior art system, as illustrated in the above references, operates to control the position of a motor, which in turn controls the element to be moved or rotated, by comparing the phase of a command phase waveform with that of a feedback waveform. In operation, a command phase counter accumulates input clock pulses and provides a square wave output waveform which is known as the command phase waveform. The clock pulses are also applied to a reference counter having the same capacity as the command phase counter. The output from the reference counter is a reference waveform which is applied to a resolver. The resolver is mechanically linked to the motor and therefore the electrical output of the resolver is a waveform having a phase dependent upon the position of the motor. The output of the resolver, which is the feedback waveform, is compared with the command phase waveform in a phase discriminator whose output in turn is used to drive the motor in a position to reduce the phase difference of the two waveforms. With no additional input pulses applied to the command phase counter, the motor will be at a standstill because the command phase waveform and the feedback waveform will be in phase.

Movement of the motor is caused by a train of velocity pulses which may be generated in accordance with a desired program or by manual control as shown in the prior art references. The velocity pulses are counted in the command phase counter along with the clock pulses thereby speeding up the command phase counter resulting in a phase advance in the command phase waveform. The advanced phase creates a phase difference which drives the motor. The speed of the motor is thus controlled by the frequency of the velocity pulses applied to the command phase counter.

If the motor is connected to the spindle of a machine tool system in which a cutting element attached to the spindle cuts a workpiece, the rotational speed of the cutting element can be controlled. At present spindle speeds are relatively crude and they may be accurately controlled by using a position control system of the prior art. However, due to toughness and possible other characteristics of materials being cut by the cutting element, it is possible that the spindle may be slowed down or brought to an abrupt stop despite the presence of the accurate position control system. Also, it is possible that the motor which controls the spindle may occasionally respond too rapidly to the command phase waveform and thereby increase the rotational speed of the spindle and possibly damage the material. Thus, even if a position control system is used to control the speed of the spindle, for highly accurate operations, in which a faulty speed may damage the workpiece, it is necessary to provide some means for monitoring the spindle speed and providing an electronic indication when the speed varies too much from the ideal speed. The electronic indication could be used to stop the entire machine tool operation.

SUMMARY OF THE INVENTION

In accordance with the present invention, two additional counters are used to generate envelope waveforms which set the limits of speed for the spindle. One of the additional counters is a fast counter and the other is a slow counter. Both have the same count capacity as the command phase counter of the position control loop, but count at slightly different rates. For example, if it is allowable that the spindle speed vary 10% from the ideal, the fast counter would accumulate the velocity pulses at a rate 10% faster than that of the command phase counter and the slow counter would accumulate velocity pulses at a rate which is 10% slower than that of the command phase counter. As a result, the output of the fast counter is a waveform which is substantially identical to the command phase waveform except that it terminates sooner than the command waveform. The output from the slow counter is also substantially identical to the command phase waveform except that it terminates later than the command phase waveform. The fast and slow counters are reset and started in substantial coincidence with the start of a feedback waveform. Thus, if the spindle is rotating at the desired speed or is within 10% of the desired speed, the termination of the feedback waveform will follow the termination of the fast counter waveform and lead the termination of the slow counter waveform. If the latter condition does not exist, a comparison means provides an output which indicates that the spindle is rotating too fast or rotating too slow.

BRIEF DESCRIPTION OF THE DRAWINGS

FIGS. 6 and 7 are waveform diagrams which are helpful in explaining the logic diagram of FIG. 4.

DESCRIPTION OF THE PREFERRED EMBODIMENT

The invention will now be described in connection with a specific embodiment. Although, for ease of explanation, the description will refer to special frequencies and timing sequences, they are only exemplary and are not intended to limit the scope of the invention.

Figure 1:
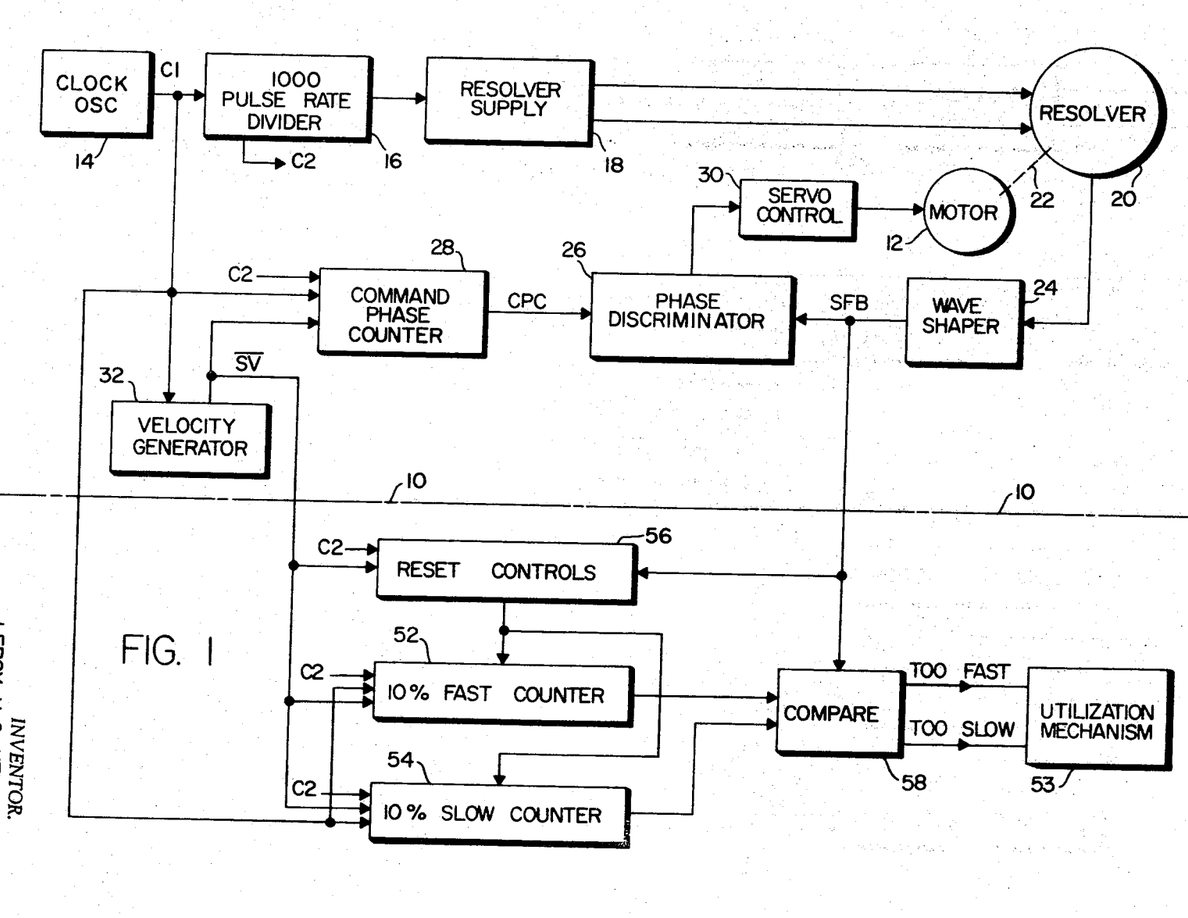
FIG. 1 is a block diagram illustrating a preferred embodiment of the present invention.
Figure 2:
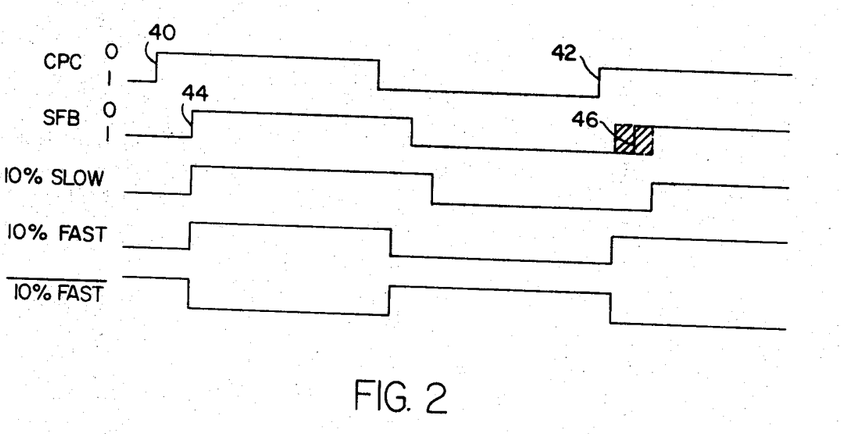
FIGS. 2 and 3 are waveform diagrams which are helpful in explaining the function of the present invention.
Figure 3:
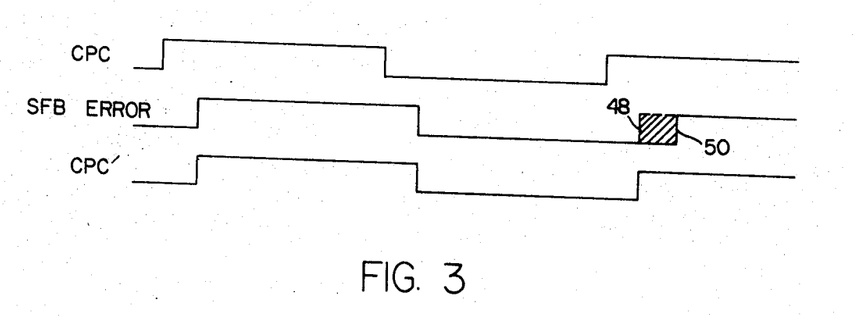

The basic idea involved in the present invention can be understood by referring to the general block diagram of FIG. 1 and the waveform diagrams shown in FIGS. 2 and 3. In FIG. 1, the system shown above the dashed line 10 is the closed loop position control apparatus. The system above the dashed line 10 is shown in the prior art references mentioned above, for use in controlling the position of a machine tool element or a machine tool bed. In the specific embodiment described herein it is assumed that the motor 12 controls the spindle rotation of a machine tool system and therefore the entire position control system controls the rotational speed of the spindle. Since the position control system is known in the prior art, only the function of each of the elements will be described herein.

The system is controlled by a clock oscillator 14 which provides clock pulses C1 at the rate of 250,000 pulses per second. The clock pulses C1 are applied to a divide by one thousand divider 16 which may be three decade counters connected in series. The 250 c.p.s. output from square wave divider 16 is applied to a resolver supply 18 which transforms the 250 c.p.s. square wave into sine and cosine waveforms at 250 c.p.s. The latter two waveforms are applied to a resolver 20 which is mechanically linked to motor 12 via mechanical linkage 22. The output of the resolver is a waveform whose phase is directly related to the rotational position of the resolver and therefore directly related to the rotational position of the motor. The resolver output is applied to a wave shaper 24 which operates to square the sinusoidal input waveform. The phase analog signal output from wave shaper 24 is the feedback waveform of the position control system and is referred to by the designation SFB. Waveform SFB is applied to one input terminal of the phase discriminator 26.

The clock pulses C1 are also applied to the command phase counter 28. The command phase counter 28 has a count capacity of 1,000 and provides an output square waveform CPC having a frequency 1,000 times less than the frequency of the input pulses. The phase digital waveform CPC is applied to the second terminal of the phase discriminator 26 which provides an output voltage to a servo control unit 30 which in turn rotates the motor 12 in a direction to reduce the phase difference between command waveform CPC and feedback waveform SFB.

The rotational speed of motor 12 and hence also the spindle speed, is determined by the frequency of pulses $\overline{SV}$ from a velocity generator 32. As described in the prior art, the output frequency may be controlled by an automatic program or it may be controlled manually. The clock pulses C1 are applied to the velocity generator 32 in order to provide synchronization between the pulses $\overline{SV}$ and the clock pulses C1.

In the absence of any $\overline{SV}$ pulses, the command phase counter 28 will receive the clock pulses C1 and provide an output square wave CPC of 250 cycles per second. The feedback waveform SFB will also be 250 cycles per second and the phase difference between CPC and SFB will be zero, resulting in no movement of the motor. It is assumed in this specific embodiment that each velocity pulse $\overline{SV}$ operates to move the motor 0.001 revolution. The manner in which a single velocity pulse $\overline{SV}$ operates to move the motor is as follows. A single velocity pulse $\overline{SV}$ applied to the command phase counter 28 is accumulated by the command phase counter along with clock pulses C1 thereby terminating a full output waveform after receiving 999 clock pulses. Thus, the waveform CPC phase leads the waveform SFB by one clock pulse period. In response to the phase difference, the phase discriminator 26 controls the servo control unit 30 to rotate the motor 12 to a position which reduces the phase difference.

In order to rotate the spindle at a constant speed, a constant frequency of $\overline{SV}$ pulses from the velocity generator is applied to the command phase counter 28. In a specific example given herein, it is assumed that $\overline{SV}$ pulses from the velocity generator appear at the rate of 50,000 per second. The latter pulses are accumulated in the command phase counter 28 along with the clock pulses C1. Since each $\overline{SV}$ pulse moves the motor 0.001 revolution, a continuous stream of $\overline{SV}$ pulses at the rate of 50,000 p.p.s. rotates the motor 12 at the rate of 50 revolutions per second or 3,000 r.p.m. For a continuous rotational speed of the motor 12, the feedback waveform SFB will continuously try but never catch up with the command waveform CPC. If the frequency of the $\overline{SV}$ pulses is constant and if the motor 12 is operating correctly, there will be a constant phase difference between CPC and SFB. A doubling of the frequency of the $\overline{SV}$ pulses would double the latter phase difference.

The relationship between the waveforms CPC and SFB is indicated by the first two waveforms shown in FIG. 2 for the condition when the motor 12 is operating at a constant speed. It is noted that there is a constant phase difference between the two waveforms. Although the two waveforms are continuous, for purposes of explanation, it is considered that a single waveform period of CPC begins at point 40 and ends at point 42. Also, a single waveform period of SFB begins at point 44 and ends at point 46.

As stated above, the present invention provides envelope waveforms for the feedback waveform in order to monitor the speed of the spindle. An understanding of the purpose of providing envelope waveforms can be had by referring to FIG. 3. The first waveform in FIG. 3 shows a single period of the CPC waveform. The second waveform shows a single period of the SFB waveform which is in error. Note that if the motor were responding correctly to the command waveform, the SFB waveform would terminate at point 48. However, due to some failure in the response of the motor such as the cutting element snagging on a hard material, the SFB wave period is not terminated until point 50. Since the CPC and SFB waveforms have the same frequency when the motor is operating correctly, a second command phase counter could be used to provide a reference which would indicate whether or not the motor is running at the ideal speed. For example, if a counter identical to command phase counter 28 were controlled so that it started counting in coincidence with the start of the SFB waveform, an output, illustrated as CPC' would occur. CPC' would thus represent the ideal feedback waveform and could be used to provide a check for the actual SFB waveform. However, actual practice does not require that the spindle be operating always at the ideal speed but it only requires that it be near the ideal speed. In accordance with the present invention the permissible limits speed can be set at any desired value and in the specific embodiment described herein it will be assumed that the limits are set at 10% of the ideal speed. In other words, as long as the spindle is rotating less than 10% faster and more than 10% slower than the ideal speed there is no need to shut down the system or provide some electronic indication of a fault.

The envelope waveforms are illustrated in FIG. 2 by the third and fourth waveform diagrams. The third diagram represents the 10% slow waveform. It will be noted that the 10% slow waveform starts in substantial coincidence with the beginning of the SFB waveform and terminates subsequent to the termination of the SFB waveform. The 10% fast waveform also begins in substantial coincidence with the SFB waveform and terminates in advance of the termination of the SFB waveform. The 10% slow and 10% fast waveforms provide an envelope waveform about the point 46 which is the ideal termination of the SFB waveform. The envelope time is indicated by the cross hatched area surrounding point 46 in the SFB waveform.

Referring back to FIG. 1, the block diagram below dashed line 10 illustrates very generally how the spindle speed of the system is monitored. The C1 clock pulses as well as the $\overline{SV}$ velocity pulses are applied to a 10% fast counter 52 and a 10% slow counter 54. The counters 52 and 54 have the same count capacity as the command phase counter 28. That is, they all have a count capacity of 1,000. However, the counters are logically controlled, as will be explained in more detail hereafter, so that the fast counter 52 effectively accumulates 11 $\overline{SV}$ pulses for every 10 $\overline{SV}$ pulses which are applied to the command phase counter 28; the slow counter effectively accumulates 9 $\overline{SV}$ pulses for every 10 $\overline{SV}$ pulses which are applied to the command phase counter 28. The $\overline{SV}$ pulses and the SFB waveform are applied to reset controls 56 which will be described in more detail hereafter. The main function of the reset controls 56 is to control the cycle timing of the monitoring circuitry and start the counters 52 and 54 in substantial coincidence with the beginning of an SFB waveform. The 10% slow waveform and 10% fast waveform in phase digital form, are applied to a compare circuit 58 which compares the latter waveforms with the SFB waveform in phase analog form generated by wave shaper 24 and provides outputs indicating that the spindle and motor are rotating too fast or too slow. The latter outputs may be used to provide a visual or audio or other indication that the spindle is operating either too fast or too slow. Also the outputs from the compare circuit 58 may be applied to some common type utilization mechanism 53 which stops the entire machine tool system or the spindle feed as the result of the spindle operating too fast or too slow.

A more detailed block diagram of the preferred embodiment of the present invention will be described in connection with FIGS. 4 through 6. Before proceeding with the description of the detailed block diagram, certain features of the logic used in the block diagram should be noted.

(1) Throughout the drawings, the convention of negative level logic is used. That is, a negative or low voltage is considered to be at the binary "1" level, and a positive or high level voltage is considered to be at the binary "0" level.

(2) All logic gates illustrated are NOR gates. That is, all inputs to the gate must be at the "0" level in order for the output to be at the "1" level. Any other condition of the inputs results in a "0" level output. Although the logic of FIG. 4 controls and monitors the motor and spindle for one direction of revolution it will be obvious to one of ordinary skill in the art that the system can be made bidirectional by the addition of more NOR gates in the input circuitry to the counters.

(3) All flip-flops are of the type described in the U.S. Pat. No. 3,211,896 to Evans et al. In order for a flip-flop to be switched or toggled, the steering input terminal must be at the "0" level and the clock input terminal associated with the steering input terminal must be going from the "1" level to the "0" level. Stated otherwise, the steering input must be positive and the clock input associated therewith must be positive going.

(4) All counters comprise a series of decade counters. The decade counters are either of the 1–2–4–8 type or the 1–2–4–5 type. Each stage of every decade counter has two possible output terminals which are always at opposite binary levels. The two output terminals of any stage are referred to as the left terminal of the stage and the right terminal of the stage. When the counter registers a count of zero, the left terminal will be at the "0" binary level and the right terminal will be at the "1" binary level.

Figure 5:
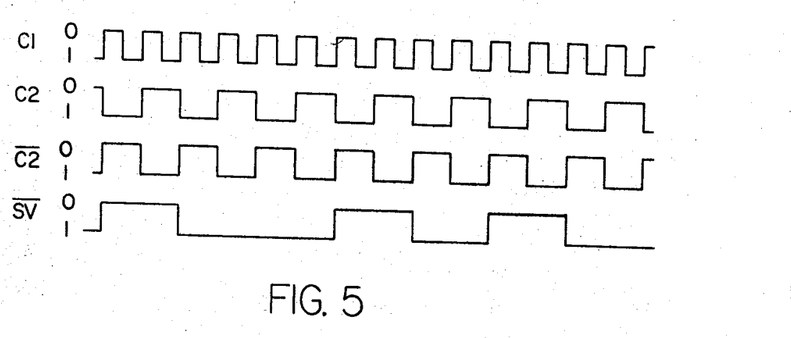
FIG. 5 is a waveform diagram for use in understanding FIG. 4.

(5) The input decade counters of the normal phase command counter, the 10% slow counter, and the 10% fast counter, are the same type as that illustrated in FIG. 5 of the Evans et al. patent. The input decade counter has three input terminals labeled NC (normal count), T (trigger), and DC (double count). If the NC input is at the "1" level and the DC input is at the "1" level, the counter will not count the trigger pulses. If the NC input is at the "0" level and the DC input is at the "1" level, the counter will count each trigger as a single unit. If the NC input is at the "1" level and the DC input is at the "0" level, the counter will count each trigger as two units.

FIG. 5 shows the timing relationship between the C1 clock pulses, the $\overline{SV}$ velocity pulses, and the additional C2 and $\overline{C2}$ clock pulses. The zeroes and ones on the left-hand side of the waveforms illustrate the binary levels of the waveforms. The C1 clock pulses occur at a rate 250,000 pulses per second and are generated by a clock oscillator 14 shown in FIG. 1. The $\overline{SV}$ velocity pulses in the present example occur at a rate of 50,000 pulses per second and span two C1 clock pulse periods. The C2 and $\overline{C2}$ clock pulses are at half the frequency of the C1 clock pulses and are used to control certain logic elements within the system, to be described in detail hereafter. The C2 and $\overline{C2}$ clock pulses may be generated by applying the C1 clock pulses to a separate flip-flop or they may be taken from the left and right terminals of the first stage of pulse rate divider 16 shown in FIG. 1.

Figure 4:
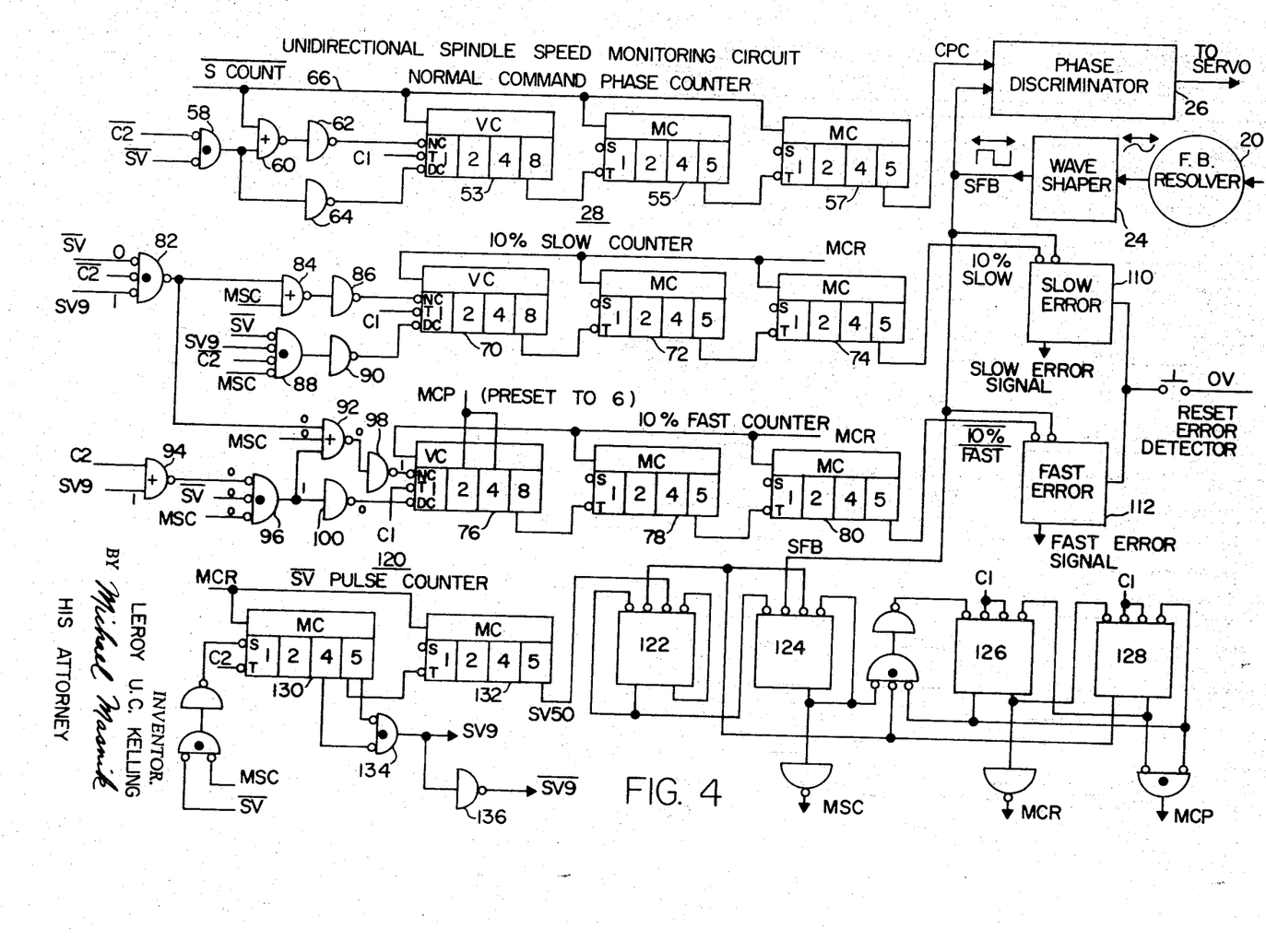
FIG. 4 is a logic diagram illustrating a portion of the details of FIG. 1.

The basic functioning of the normal command phase counter, the 10% slow counter and the 10% fast counter illustrated in FIG. 4, is as follows: The normal phase command counter accumulates the C1 clock pulses as individual unit pulses until an $\overline{SV}$ velocity pulse is received. When an $\overline{SV}$ velocity pulse is received, the command phase counter counts the C1 clock pulse as two units. The effect is the same as if the $\overline{SV}$ pulses are added to the train of C1 clock pulses. The slow counter operates the same as the normal command phase counter with the exception that every 10th $\overline{SV}$ velocity pulse is ignored. The effect is that the slow counter counts 10% less velocity pulses than the normal command phase counter. The 10% fast counter operates in the same manner as the normal command phase counter with the exception that for every 10th $\overline{SV}$ pulse, the counter double counts two of the C1 clock pulses. The effect is that the fast counter counts 10% more velocity pulses than the normal command phase counter.

As shown in FIG. 4, the normal command phase counter 28 comprises three decade counters 53, 55 and 57. The latter decades are reset to the zero condition by a "1" level pulse $\overline{S\ COUNT}$ which appears on lead 66. The $\overline{S\ COUNT}$ pulse may be applied to the resetting input terminals of the command phase counters 28 by electronic or manual means at the start of the operation. When the $\overline{S\ COUNT}$ is at the "1" level, the output from gate 60 will be at the "0" level, and the output from gate 62 will be at the "1" level, thus preventing the command phase counter 28 from counting the C1 clock pulses during the resetting period. In the absence of a velocity pulse, $\overline{SV}$ is at the "1" level and therefore the output of NOR gate 58 is at the "0" level, the output of NOR gate 60 is at the "1" level and the output of NOR gate 62 is at the "0" level. Also, the output of NOR gate 64 is at the "1" level. Thus, with the NC input at the "0" level and the DC input at the "1" level, each C1 clock pulse received is counted as one unit and the command phase counter 28 effectively counts the C1 clock pulses by ones.

When a velocity pulse arrives, $\overline{SV}$ goes to the "0" level. As seen from the graph in FIG. 5, $\overline{SV}$ remains at the "0" level for two C1 clock periods, but $\overline{C2}$ remains at the "0" level for only a single C1 clock period. Thus, $\overline{SV}$ and $\overline{C2}$ will both be at the "0" level for a single C1 clock period. During that time, the output of NOR gate 58 will be at the "1" level, causing the NC input to decade 52 to be at the "1" level and the DC input to decade 52 to be at the "0" level. As a result, during that single C1 clock period, the command phase counter 28 counts the C1 clock pulse as two units.

The CPC waveform, which is shown in FIG. 2, is taken from the left terminal of the last stage of decade counter 56. Since decade counter 56 is a 1–2–4–5 decade counter the left output terminal of the last stage will be at the "0" level when the counter is reset and will remain at the "0" level until the command phase counter 28 has accumulated a count of 500, at which time it will switch to the "1" level. The output will not revert back to the "0" level until the command phase counter has accumulated a count of 1000 thereby recycling back to the zero count condition. The CPC waveform is applied to one input of phase discriminator 26 whose output is applied to the servo shown in FIG. 1. The other input to the phase discriminator 26 is the feedback waveform SFB which is derived from the feedback resolver 20 and the wave shaper 24.

The 10% slow counter comprises three decade counters 70, 72 and 74. The 10% fast counter comprises the three decade counters 76, 78 and 80. As stated above, the slow and fast counters are started or reset to zero in substantial coincidence with the start of the feedback waveform SFB. The exact timing sequence for generating the MCR pulse to reset the slow and fast counters will be described in detail hereafter, but for the present it is sufficient to assume that the MCR reset pulse occurs in substantial coincidence with the start of the SFB waveform. Thus, with the slow counter reset to the zero condition, and in the absence of an $\overline{SV}$ input, the slow counter begins accumulating the C1 clock pulses. Each C1 clock pulse is counted as a single unit.

The logic for controlling the count of the slow counter includes NOR gates 82, 84, 86, 88 and 90. In the absence of a velocity pulse, $\overline{SV}$ will be at the "1" level and the output of NOR gate 82 will be at the "0" level. The MSC input to NOR gate 84 is normally at the "0" level, as will be discussed hereafter, and therefore the output of NOR gate 84 will be at the "1" level and the output of NOR gate 86 will be at the "0" level. Also, the fact that $\overline{SV}$ is at the "1" level causes the input to the DC terminal of decade counter 70 to be at the "1" level. As a result, the 10% slow counter is in condition to count each C1 clock pulse as a single unit.

The only logical input to the NOR gates 82 through 90 which has not been mentioned thus far is the logical input SV9. The latter input is normally at the "0" level and switches to the "1" level in coincidence with every 10th $\overline{SV}$ pulse. Thus, for 90% of the velocity pulses, the output of NOR gate 82 will be at the "1" level causing the output of 84 to be at the "0" level and the output of 86 to be at the "1" level. Also, the output of 88 will be at the "1" level and the output of 90 will be at the "0" level. The result of the latter logical combination is that for 90% of the velocity pulses, the 10% slow counter counts a single C1 clock pulse as two units. Note that even though the velocity pulse spans two C1 clock pulses, the input $\overline{C2}$ causes the counter to double count only one of the C1 clock pulses.

For every 10th velocity pulse, the input SV9 will be at the "1" level thus preventing the slow counter from recognizing the velocity pulse. When this happens, the 10% slow counter counts the C1 clock pulse as a single unit. As a result of the operation of the 10% slow counter and the associated logic, the 10% slow counter will effectively add only 90% of the velocity pulses to the input clock pulse train. The output from the 10% slow counter is taken from the last stage of the 1–2–4–5 decade counter 74. The 10% slow output is illustrated in FIG. 2 and is applied to the steering input of the slow error flip-flop 110. The trigger input to the slow error flip-flop 110 receives the waveform SFB. Thus, as can be seen from the waveform shown in FIG. 2, if the positive going edge of the waveform SFB, is within the limit set by the 10% slow counter, then the steering input of the slow error flip-flop 110 will be at the "1" level when the trigger arrives causing no switching of the flip-flop. However, if the positive going edge 46 of the waveform SFB falls outside the limit set by the 10% slow waveform, the steering input to the flip-flop 110 will be at the "0" level when the trigger arrives thus causing the flip-flop 110 to switch thereby providing an output which indicates a slow error signal. The latter output may be used to provide a visual or aural or other indication, or stop the entire machine control system.

The 10% fast counter is controlled by the NOR gates 82, 92, 94, 96, 98 and 100. The latter gates operate to cause the fast counter to count each C1 clock pulse as a single unit in the absence of a velocity pulse, and count the C1 clock pulse as two units in response to 90% of the velocity pulses. The latter two types of counts are controlled in a manner identical to that for the 10% slow counter. However, the logic of the fast counter is arranged so that for 10% of the velocity pulses, corresponding to SV9 being at the "1" level, the counter double counts two C1 clock pulses. It will be noted that if a counter only double counted one of the C1 clock pulses, it would be running at the same rate as the normal command phase counter. However, by counting two C1 clock pulses at the double count rate, it is counting 10% faster than the normal command phase counter. The logical functioning of the NOR gates during the period when $\overline{SV}$ is at the "0" level and SV9 is at the "1" level is as follows: Since SV9 is at the "1" level, the output of gate 82 is at the "0" level. Also, the output of gate 94 is at the "0" level. Since MSC is normally at the "0" level and $\overline{SV}$ is at present by definition at the "0" level, the output of gate 96 is at the "1" level. The output of gate 96 causes the output of gate 92 to be at the "0" level and the output of gate 100 to also be at the "0" level. The output of gate 98 is at the "1" level. Thus, with the input to NC at the "1" level and the input to DC at the "0" level, the counter double counts each C1 clock pulse. The latter conditions exist for the entire time that SV9 is at the "1" level and $\overline{SV}$ is at the "0" level. Therefore two of the C1 clock pulses are double counted.

The output from the 10% fast counter, which is the 10% fast waveform, is applied to the steering input terminal of a fast error flip-flop 112. The SFB waveform is applied to the triggering input terminal of the flip-flop 112. It will be noted that the output of the 10% fast counter is taken from the right-hand terminal of the last stage of the counter whereas the output from the normal command phase and the 10% slow counters are taken from the left-hand terminals of the last stages respectively. If the output of the fast counter were taken from the left-hand terminal of the last stage of decade 80, it would appear as indicated in the fourth waveform of FIG. 2 labeled "10% fast." However, in order to provide proper steering for the flip-flop 112, the output is taken from the right-hand terminal and appears as illustrated in the fifth waveform of FIG. 2 labeled "$\overline{10\% \text{ fast}}$." The latter waveform is an inversion of the 10% fast waveform. Thus, if the positive going edge 46 of the waveform SFB, which is also the triggering edge for the slow error and fast error flip-flops, is within the limit set by the 10% fast counter, the steering input to the fast error flip-flop 112 will be at the "1" level when a trigger arrives thereby causing no output indication. However, if the edge 46 occurs outside the limit set by the 10% fast counter, the steering input to flip-flop 112 will be at the "0" level when the triggering input 46 arrives thereby causing the fast error flip-flop 112 to provide an output which indicates that there is a fast error. The latter output may be used to provide an indication or may be used to stop the entire machine tool system.

The remaining logic circuitry of FIG. 4 corresponds generally to the reset control unit 56 of FIG. 1 and is operative to control the monitoring cycle of the system. The reset control circuitry is divided into two parts. The first part includes the $\overline{SV}$ pulse counter 120 and associated NOR logic gates; the second part includes flip-flops 122 through 128 and the associated NOR logic gates. A monitoring cycle, as that term is used herein, determines the time between resetting of the fast and slow counters. For the specific embodiment described herein, the monitoring cycle is equal to 50 velocity pulse times or a single SFB waveform, whichever is greater. As will be apparent to anyone of ordinary skill in the art, the time between resetting of the slow and fast counters is a matter of choice and may be easily varied by changing the capacity of the $\overline{SV}$ pulse counter 120.

The SV pulse counter 120 comprises a pair of 1–2–4–5 decade counters 130 and 132. The counter 120 is reset to zero at the same time that the 10% slow and 10% fast counters are reset to zero. All are reset by the MCR input going to the "1" level. Following the zeroing of counter 120, it begins accumulating the $\overline{SV}$ pulses. When the 50th $\overline{SV}$ pulse has been received, the SV50 output of counter 120 goes to the "0" level thereby triggering flip-flop 122. The SV50 output, which is taken from the right-hand terminal of the last stage of decade counter 132, is illustrated in FIG. 6. When the flip-flop 122 is triggered by SV50, the circuitry which comprises flip-flops 122 through 128 and associated NOR gates is put in the ready condition to receive the positive going edge of the SFB waveform. It will be noted that the SFB waveform is connected to the left-hand triggering input of flip-flop 124.

Figure 6:
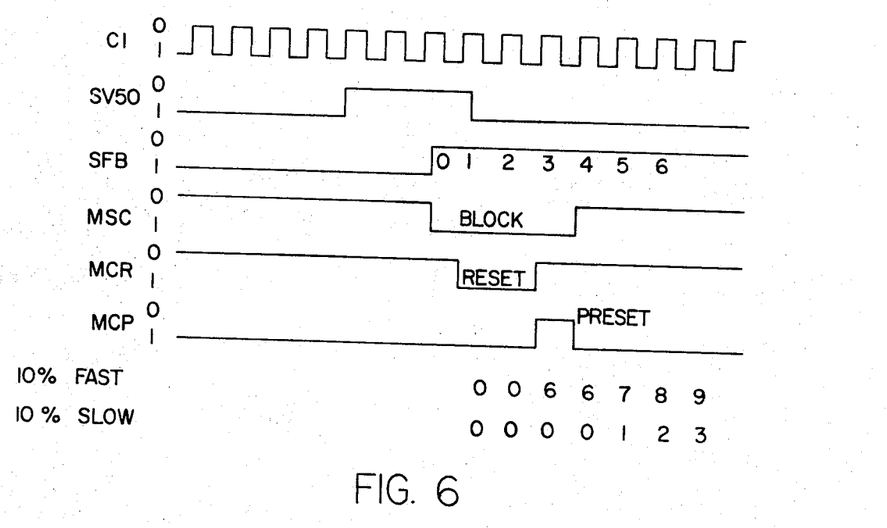

An example of the timing of the positive going edge of the SFB waveform with respect to the SV50 waveform is illustrated in the second and third waveform diagrams of FIG. 6. Due to the interconnection of the flip-flops and the NOR gates as illustrated in FIG. 4, the three controlling outputs MSC, MCR, and MCP, occur in the sequence illustrated in the third, fourth and fifth waveform diagrams of FIG. 6. It is noted that MSC is normally at the "0" level, but is switched to the "1" level following the positive going edge of SFB (provided that the flip-flop circuitry is in the ready condition as a result of SV50). MSC remains at the "1" level for about 4 clock pulse periods. One clock pulse after the positive going edge of SFB is received, MCR, which is normally at the "0" level, switches to the "1" level and remains there for two C1 clock pulse periods. The MCP output is normally at the "1" level and it switches to the "0" level 3 clock pulse periods following the positive going edge of the SFB waveform. It remains at the "0" level for a single C1 clock pulse period. Thus, the sequence of events at the beginning of a cycle is as follows. After the 50th velocity pulse is counted, SV50 goes positive thereby putting the flip-flop circuitry in the ready condition. When SFB goes positive, MSC drops to the "1" level for about 4 clock periods. It will be noted that when MSC is at the "1" level, the NC and DC inputs to the 10% slow and 10% fast counters will both be at the "1" level thereby preventing the C1 clock pulses from being counted. Note that the MSC input is applied to NOR gates 84, 88, 92, and 96. Thus, for 4 clock periods there is nothing accumulated by the slow and fast counters. Next, MCR which is normally at the "0" level, drops to the "1" level thereby resetting the slow counter, the fast counter, and the $\overline{SV}$ pulse counter to the zero condition. The next step in the cycle is that MCP goes to the "0" level for a single clock period. Note that the MCP is connected to the second and third stages of decade 76 of the 10% fast counter. Thus, when MCP goes to the "0" level, the second and third stages are put in a set condition thereby initially placing a count of "6" in the fast counter. Four C1 clock pulse periods after the positive going edge of SFB, the outputs MSC, MCR, and MCP have returned to their normal states and the slow and fast counters are allowed to accumulate the clock pulses.

It should be noted that the 10% slow counter starts at a count of zero and the first input pulse will change its condition to read a count of "1," whereas the 10% fast counter starts at a count of 6 and the first input pulse thereto causes it to change its count condition to a count of 7. Also the SFB waveform has already been in existence the equivalent of 3 clock pulse periods. As a result, the fast and slow counters are initially started with a straddle about the SFB waveform. In other words, the 10% fast counter is "effectively" started 3 clock pulse periods ahead of the SFB waveform whereas the 10% slow counter is "effectively" started 3 clock pulse periods following the SFB waveform. Thus, it can be understood what was intended above when it was stated that the fast and slow counters begin in substantial coincidence with the SFB waveform. The purpose of initially straddling the SFB waveform is to avoid a speed error showing up if the system is slightly off in time at the beginning of the checking cycle. The numbers shown in FIG. 6 represent the counts of the fast and slow counters with respect to the start of the SFB waveform.

The NOR logic gates associated with the $\overline{SV}$ pulse counter 120 are arranged so that when MSC is in its normal condition, every $\overline{SV}$ pulse is accumulated as a single unit. The 9th $\overline{SV}$ pulse accumulated by the counter 120 causes the SV9 output to go to the "1" level, and every 10th $\overline{SV}$ input afterwards causes the SV9 output to go to the "1" level. Following the 50th $\overline{SV}$ input, the output SV50 goes to the "0" level thereby readying the flip-flop circuitry and allowing the generation of an MCR pulse which resets pulse counter 120 to the zero condition.

It will be apparent that for the numbers given in the specific example, the pulse counter 120 will receive 50 $\overline{SV}$ pulses in less than one SFB period. Thus the time of a single SFB period controls the cycle time of the monitoring system. However, the cycling time would be longer than a single SFB period if either the $\overline{SV}$ pulses were at a much lower frequency of if the capacity of the $\overline{SV}$ pulse counter were greatly increased. It will be apparent to those of ordinary skill in the art that if the cycling time, or time between resetting of the slow, fast and $\overline{SV}$ pulse counters is much greater than the time of a single SFB period, the envelope created which surrounds the positive going edge of the SFB waveform, as illustrated in FIG. 2, will be continuously expanding. The expansion of the envelope is not only permissible but is desirable. The expanded envelope continues to represent a 10% fast and a 10% slow limit of the spindle speed, but in order to provide an error indication toward the end of the cycle, the spindle would have to be operating outside of the 10% limits for a relatively long period of time. This is illustrated by FIGS. 7 and 8.

Figure 7:
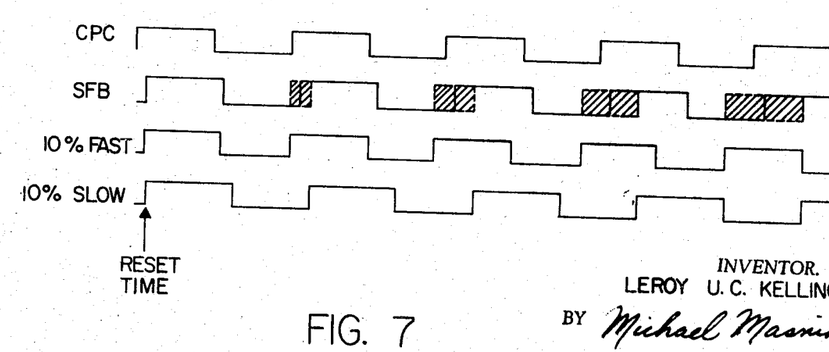
FIG. 7 is a waveform diagram and FIG. 8 is a diagram of time versus relative phase. Both illustrate conditions of the invention for a particular monitor cycle timing sequence.

FIG. 7 shows the CPC, SFB, 10% fast and 10% slow waveforms for the situation where the interval between resetting of the 10% fast and 10% slow counters is much greater than a single SFB waveform period. It will be noted that the hash marked area which represents the envelope about the positive going edge of the SFB waveform is continuously expanding with time. FIG. 8 is a diagram which visually represents the phase of the 10% fast and 10% slow counters with respect to the phase of the SFB waveform, assuming that the SFB waveform is ideal. The horizontal line 150 represents the phase of the SFB waveform for a system in which the spindle is rotating at the desired speed. The line 152 represents the phase of the 10% fast waveform with respect to the phase of SFB waveform. The line 154 represents the phase of the 10% slow waveform with respect to the phase of the SFB waveform. It will be noted that the phase of the 10% fast waveform increases its lead over the phase of the ideal SFB waveform at a rate of 10%, and the phase of the 10% slow waveform increases its phase lag with respect to the ideal SFB waveform at the rate of 10%. Also, it will be noted that at reset time, the 10% fast and slow waveforms are already out of phase with the ideal SFB waveform due to the staggering of the 10% slow and fast counters as described in connection with FIG. 4.

Figure 8:
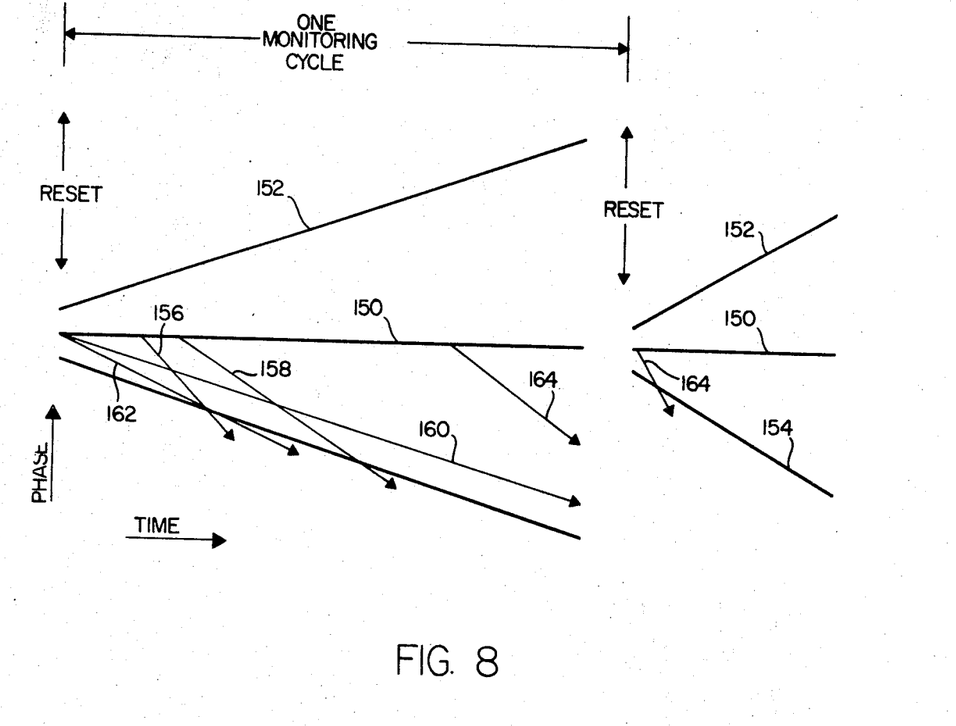

The arrows shown in FIG. 8 represent examples of actual SFB phases resulting from the spindle failing to operate at the desired speed. It will be apparent that if the spindle is operating at exactly the 10% limit of speed, the phase of the SFB waveform with respect to the phase of the ideal waveform would be as indicated by the arrow 160. Note that due to the initial offset, the arrow 160 would never cross the line 154 and therefore there would be no detection of error. However, if the spindle were operating slightly outside of the 10% limit, say at an 11% rate, and started operating at that rate at the reset time, the actual SFB waveform phase would be represented by the arrow 162. It is noted that the arrow 162 crosses the 10% slow line 154, and at that point a 10% slow error would be detected. The arrows 156 and 158 represent phases of SFB waveforms which deviate greatly from the ideal but which start deviating some time after the reset time. A situation like that may occur if the spindle hits a snag and comes to an abrupt slowdown some time during the middle of a monitoring cycle. If the slowdown is very great, such as illustrated by arrows 156 or 158, the error will be detected during the existing cycle. However, if the slowdown is only slight, e.g., the speed is 11% slower than the ideal, the error would not be detected during the existing cycle. If the error continues, it will be detected near the beginning of the following cycle. The latter error is illustrated by the arrows 164.

While the invention has been particularly shown and described with reference to preferred embodiments thereof, it will be understood by those skilled in the art that various changes in form and details may be made therein without departing from the spirit and scope of the invention.

What is claimed as new and desired to be secured by Letters Patent of the United States is:

1. A motor speed monitoring system for a closed loop position control system in which a phase digital command waveform representing the desired rotational speed is compared with a feedback phase analog waveform representing the actual rotational speed to control the speed of a motor, said motor speed monitoring system comprising
    (a) means responsive to said command waveform for generating an upper speed and lower speed electronic envelope representing in phase digital form the predetermined outside limits of permissible motor rotational speed, and
    (b) means responsive to said electronic envelope and said feedback waveform for providing an electronic indication when the speed of said motor, as represented by said feedback waveform, is outside the limit set by said envelope.

2. A motor speed monitoring system for a closed loop position control system in which a command waveform representing the desired rotational speed is compared with a feedback waveform representing the actual rotational speed to control the speed of a motor, said motor speed monitoring system comprising
    (a) means for generating an electronic envelope representing the predetermined outside limits of permissible motor rotational speed,
    (b) means responsive to said electronic envelope and said feedback waveform for providing an electronic indication when the speed of said motor, as represented by said feedback waveform, is outside the limit set by said envelope,
    (c) said means for generating an electronic envelope comprising means for generating a first waveform having a phase with respect to said command waveform representing the fast limit of speed of said motor, and
    (d) means for generating a second waveform having a phase with respect to said command waveform representing the slow limit of speed of said motor.

3. A motor speed monitoring system as claimed in claim 2 wherein said means for providing an electronic indication comprises
    (a) means responsive to said first waveform and said feedback waveform for generating a fast-error indication when said feedback waveform phase leads said first waveform, and
    (b) means responsive to said second waveform and said feedback waveform for generating a slow-error indication when said feedback waveform phase lags behind said second waveform.

4. A motor speed monitoring system for a closed loop position control system of the type having a source of clock pulses, a source of velocity pulses whose frequency represents desired motor speed, a command phase counter having a predetermined count capacity for providing a command square waveform having a period determined by the time it takes said counter to recycle, means responsive to said clock and velocity pulses for causing said command phase counter to count said clock and velocity pulses, feedback signal generating means responsive to the rotation of said motor for generating a feedback square waveform having a period dependent upon the motor speed, and means for controlling said motor in accordance with the phase difference between said command and said feedback waveform, said speed monitoring system comprising
    (a) means responsive to said clock and velocity pulses for generating an electronic envelope representing the predetermined outside limits of permissible motor speed, and
    (b) means responsive to said electronic envelope and said feedback waveform for providing an electronic indication when the speed of said motor is outside the limits set by said envelope.

5. A motor speed monitoring system as claimed in claim 4 further comprising means for periodically starting the generation of said envelope in substantial phase coincidence with said feedback waveform.

6. A motor speed monitoring system as claimed in claim 5 wherein said means for generating an envelope comprises
    (a) a slow counter means, having a count capacity equal to said command counter, for providing an output slow waveform having a period determined by the time it takes said slow counter means to recycle,
    (b) a fast counter means, having a count capacity equal to said command phase counter for providing an output fast waveform having a period determined by the time it takes said fast counter to recycle, and
    (c) means responsive to said clock and velocity pulses for causing said slow counter to count said clock pulses and said velocity pulses at a rate which is X% slower than the actual velocity pulse frequency and for causing said fast counter to count said clock pulses and said velocity pulses at a rate which is X% faster than the actual velocity pulse frequency, whereby the predetermined limits of motor speed are X% faster and X% slower.

7. A motor speed monitoring system as claimed in claim 6 wherein said means for providing an electronic indication comprises
    (a) means responsive to said slow waveform and said feedback waveform for providing a slow-speed error indication when said slow waveform phase leads said feedback waveform, and (b) means responsive to said fast waveform and said feedback waveform for providing a fast-speed error indication when said feedback waveform phase leads said fast waveform.

8. A motor speed monitor as claimed in claim 7 wherein said means described in paragraph (c) of claim 6 comprises (a) X% counting means responsive to said velocity pulses for generating one additional pulse for even N velocity pulse, whereby $$\frac{1}{N} \times 100\% = X\%$$

(b) logic circuit means responsive to said clock, velocity and additional pulses, for causing said slow counter to double count one clock pulse for each velocity pulse not in coincidence with an additional pulse and single count at all other clock pulses, and (c) logic circuit means responsive to said clock, velocity and additional pulses for causing said fast counter to double count two clock pulses for each velocity pulse in coincidence with an adidtional pulse, double count a single clock pulse for each velocity pulse not in coincidence with an additional pulse, and single count all other clock pulses.

9. A motor speed monitor as claimed in claim 8 wherein said means for periodically starting said envelope comprises (a) counting means for providing a trigger output in response to a predetermined number of velocity pulses and (b) envelope starting means responsive to said trigger output and said feedback waveform for resetting, presetting and starting said fast and slow counters to cause said fast waveform to initially phase lead said feedback waveform by a few clock pulse periods and said slow waveform to initially phase lag said feedback waveform by a few clock pulse periods.

10. A monitoring system in which a command phase digital waveform representing a desired signal characteristic is compared with a feedback phase analog waveform representing an actual signal characteristic to control the value of said characteristic of said signal, said monitoring system comprising (a) means responsive to said command waveform for generating an upper speed and a lower speed electronic envelope representing the predetermined outside limits of permissible values of signal characteristic, and (b) means responsive to said electronic envelope and said feedback waveform for providing an electronic indication when said signal characteristic as represented by said feedback waveform, is outside the limit set by said envelope, and (c) means for utilizing said indication.

11. A monitoring system for controlling the speed of an object comprising a source of command phase digital signals representing a desired speed for the object, a source of feedback phase analog signal representing the actual speed of said object, means for comparing said command phase digital signals with said feedback phase analog signals to derive an error signal, means for controlling the speed of said device comprising means for generating a phase digital margin signal representing the predetermined outside limits of permissible values of speed, and means responsive to said phase digital margin signal and said feedback phase analog signal for providing a monitoring signal.

References Cited
UNITED STATES PATENTS

| | | | |
|---|---|---|---|
| 2,798,997 | 7/1957 | Curtis | 318—318 |
| 3,181,403 | 5/1965 | Sterns et al. | 318—162 |
| 3,257,595 | 6/1966 | Polakowski | 318—314 |
| 3,331,006 | 7/1967 | Strand et al. | 318—314 |
| 3,382,423 | 5/1968 | Clark | 318—318 |
| 3,374,359 | 3/1968 | Anderson | 318—20 |
| 3,395,326 | 7/1968 | Hebb | 318—318 |
| 3,425,401 | 2/1969 | Lang | 317—5 |

ORIS L. RADER, Primary Examiner

H. HUBERFELD, Assistant Examiner

U.S. Cl. X.R.

318—341